No. 826,214. PATENTED JULY 17, 1906.
J. J. JOHNSTON, DEC'D.
J. E. ALLEN, ADMINISTRATOR.
APPARATUS FOR MANUFACTURING GAS.
APPLICATION FILED SEPT. 17, 1897.
8 SHEETS—SHEET 1.
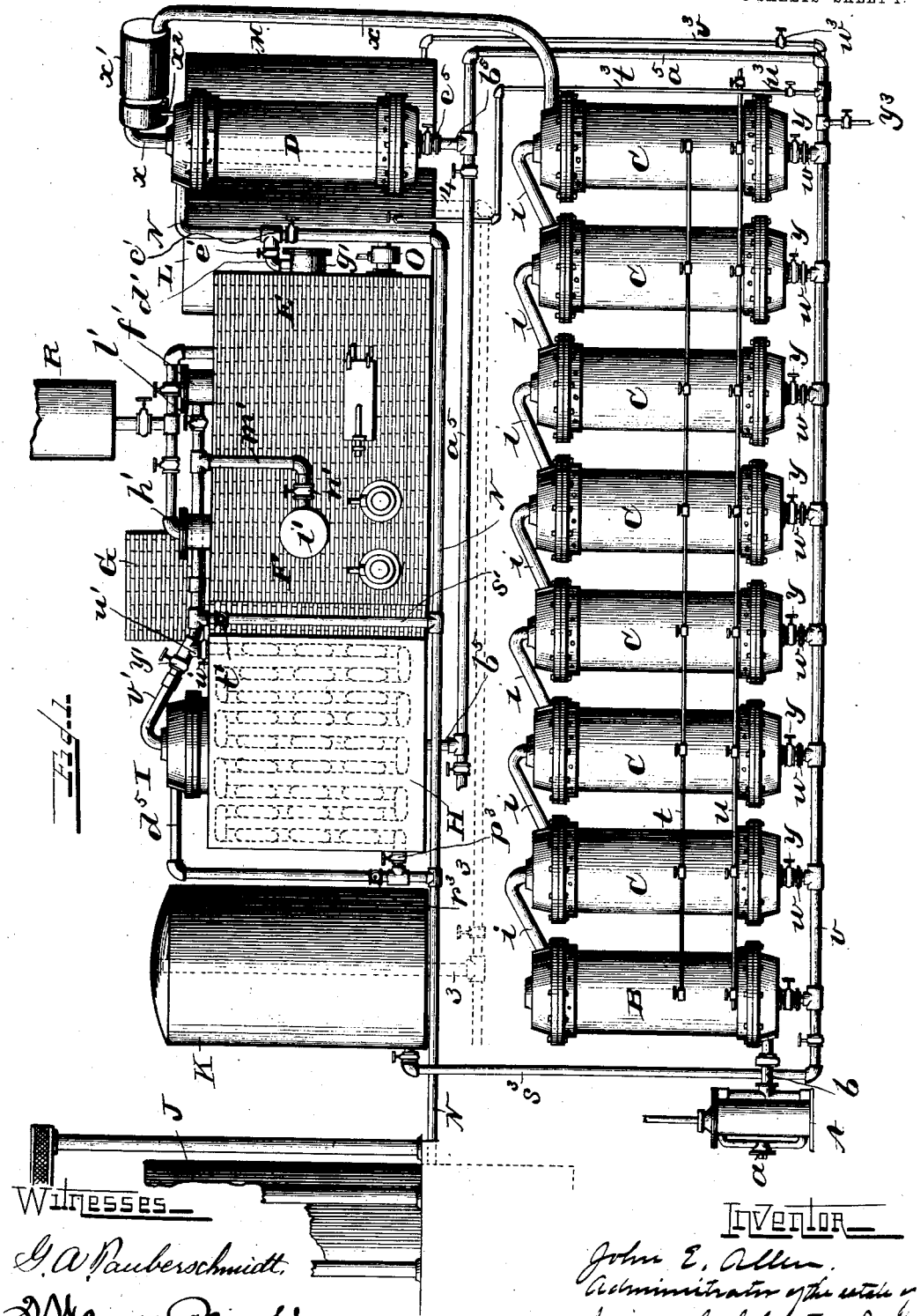

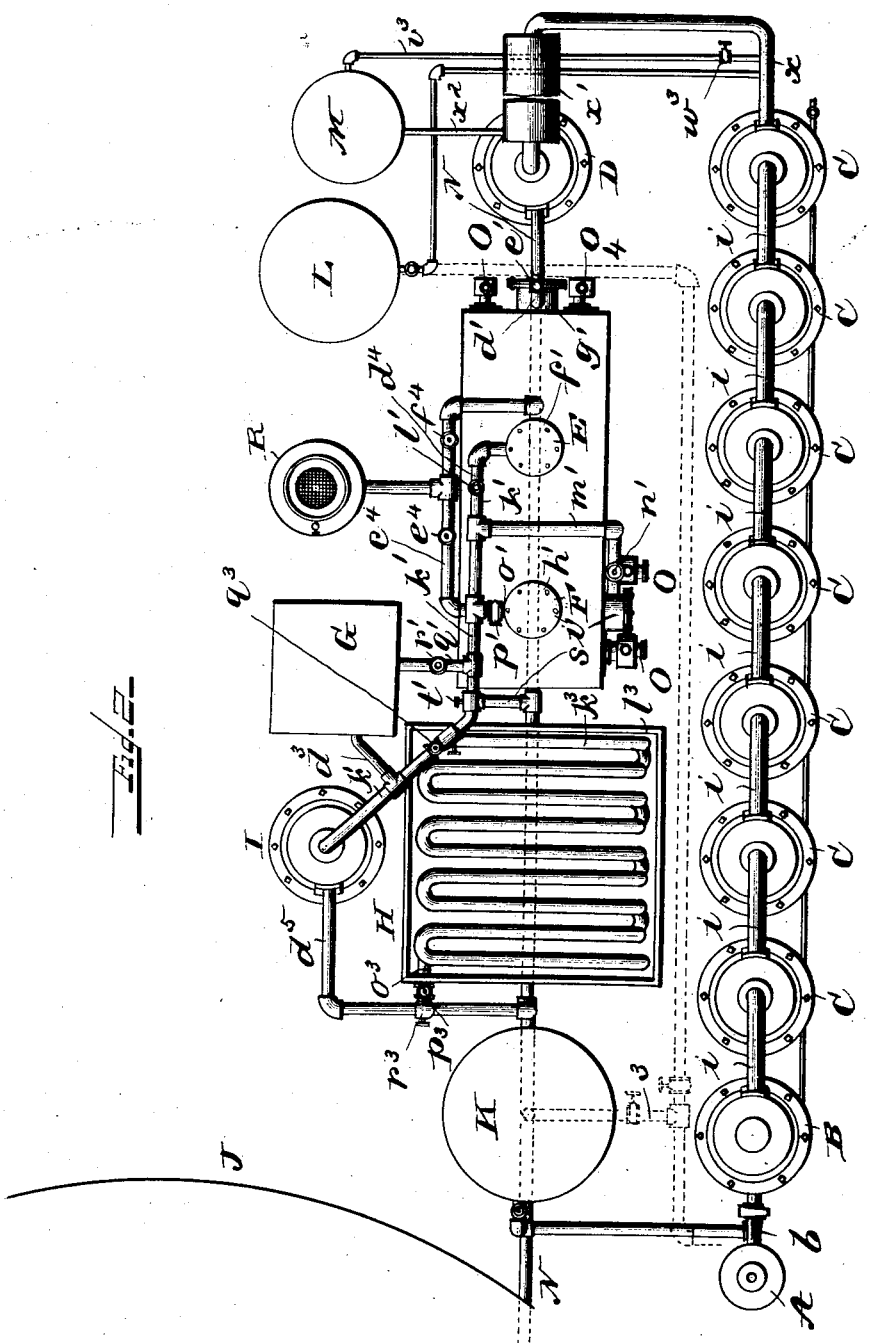

No. 826,214. PATENTED JULY 17, 1906.
J. J. JOHNSTON, DEC'D.
J. E. ALLEN, ADMINISTRATOR.
APPARATUS FOR MANUFACTURING GAS.
APPLICATION FILED SEPT. 17, 1897.
8 SHEETS—SHEET 3.
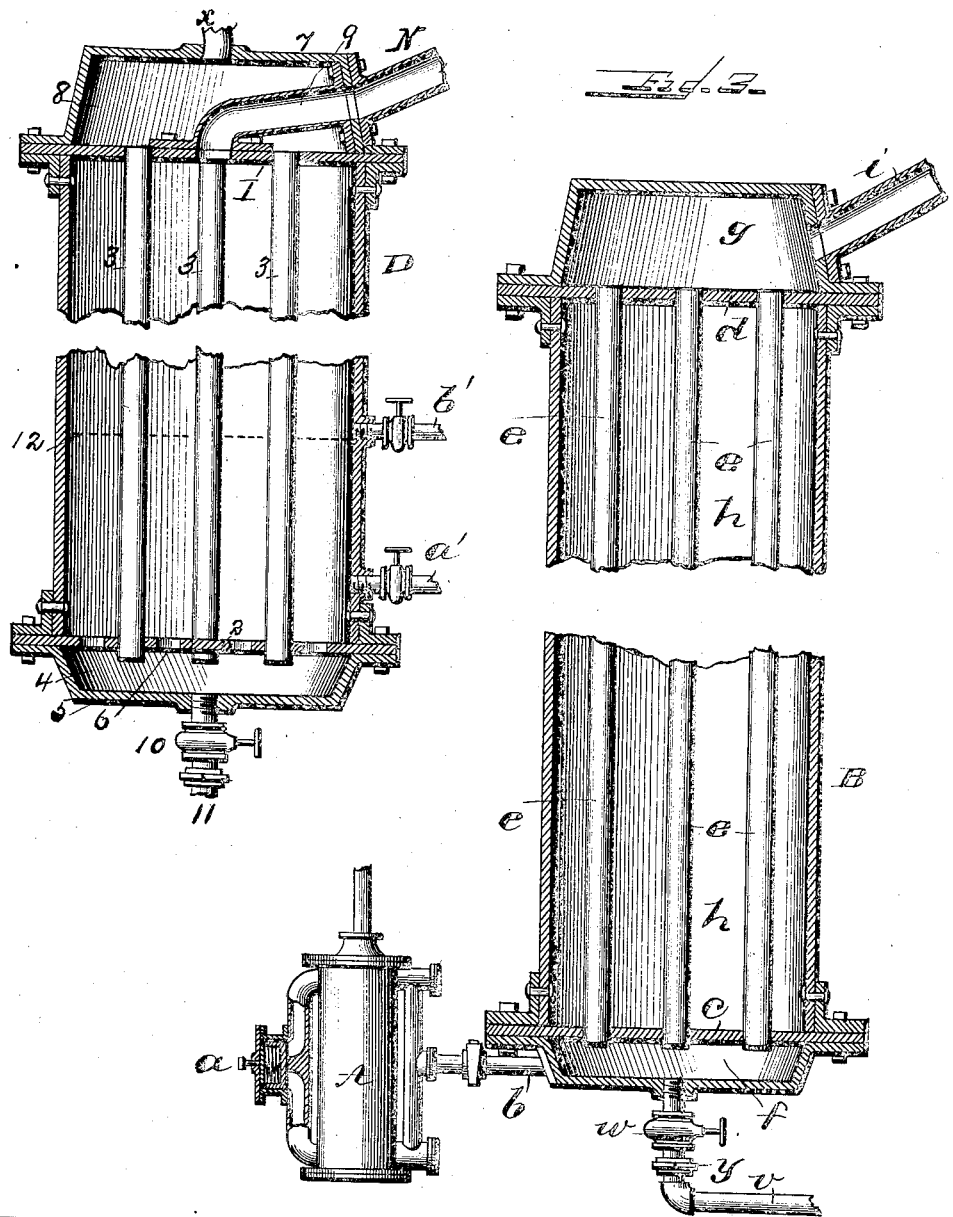

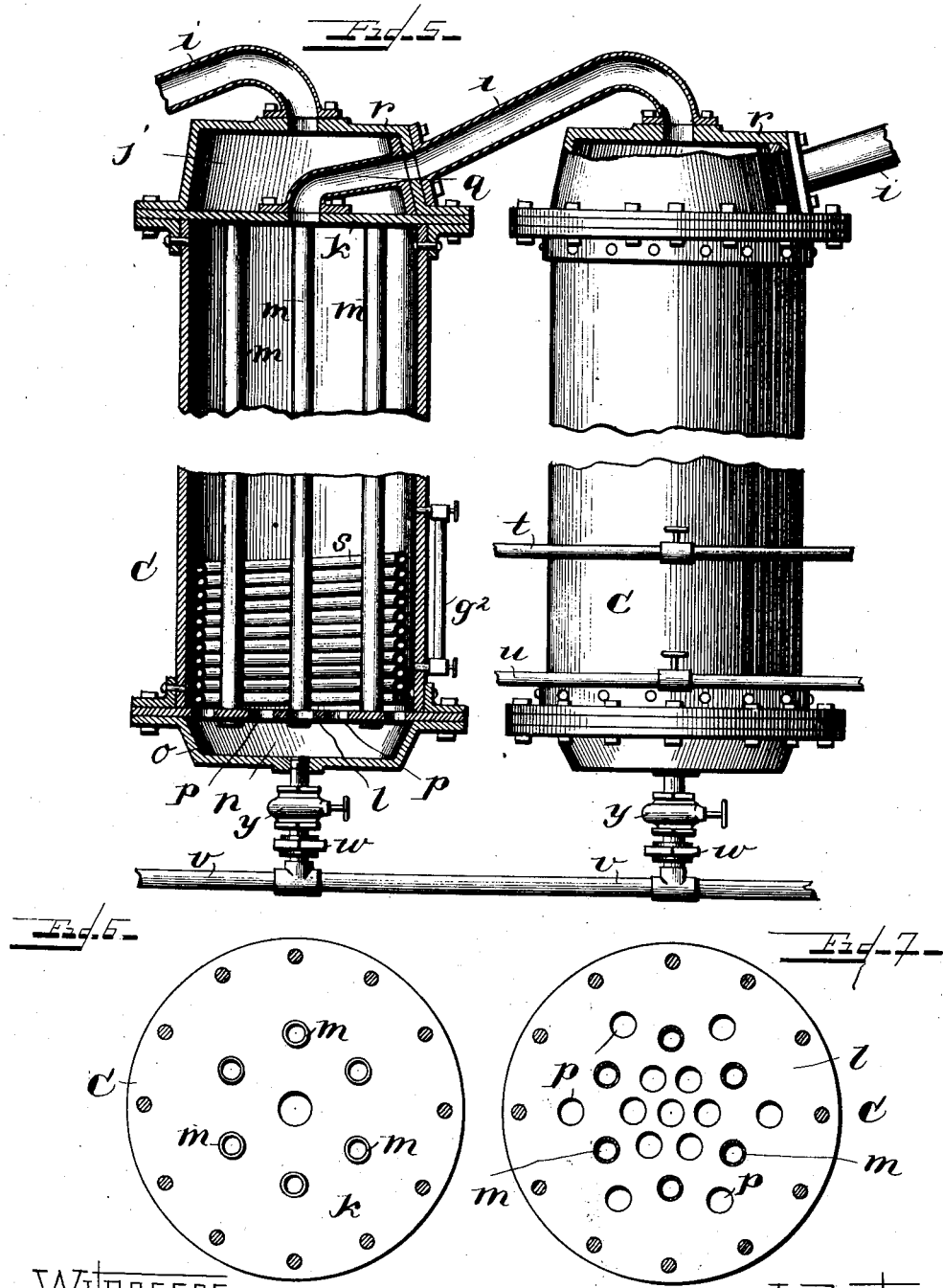

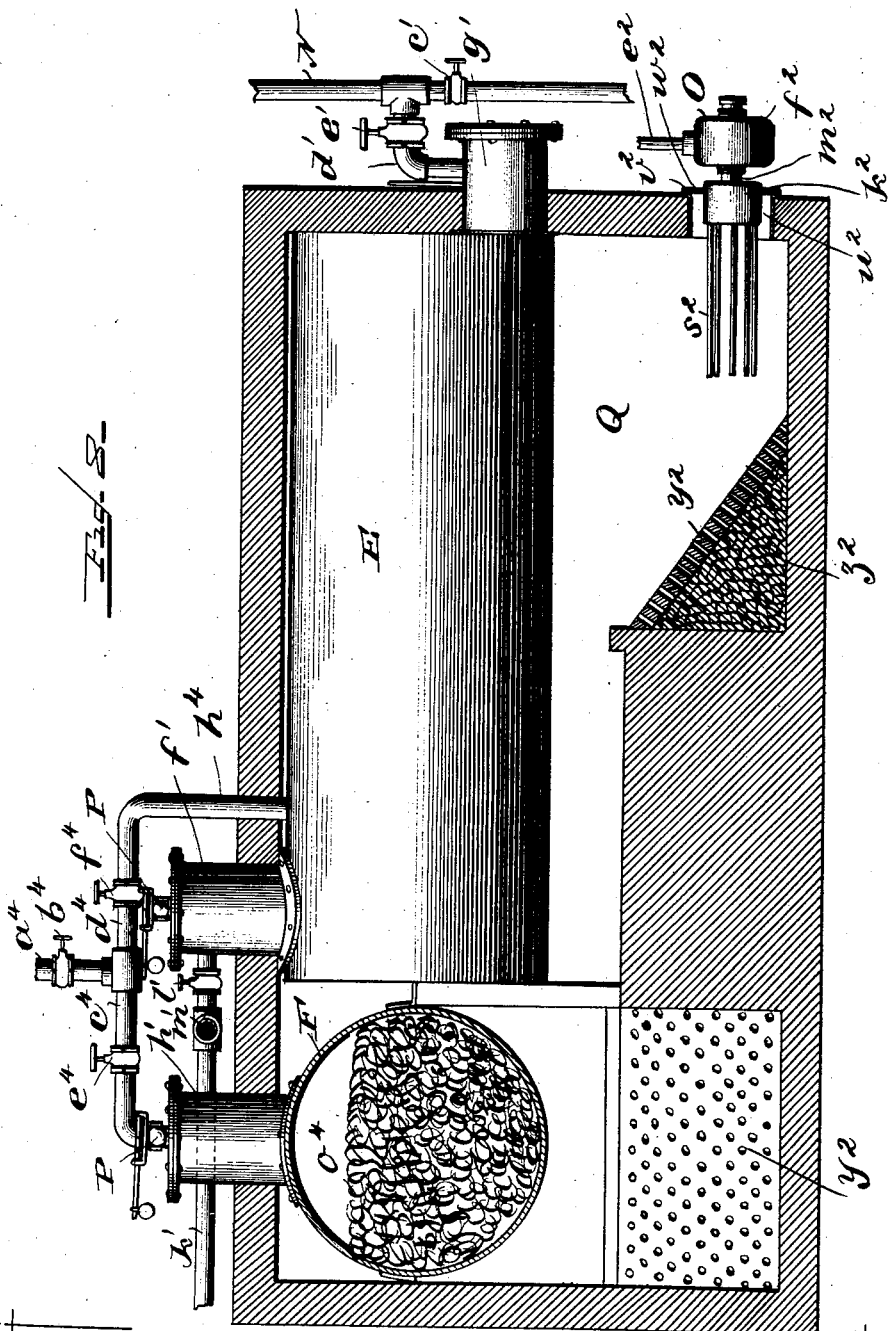

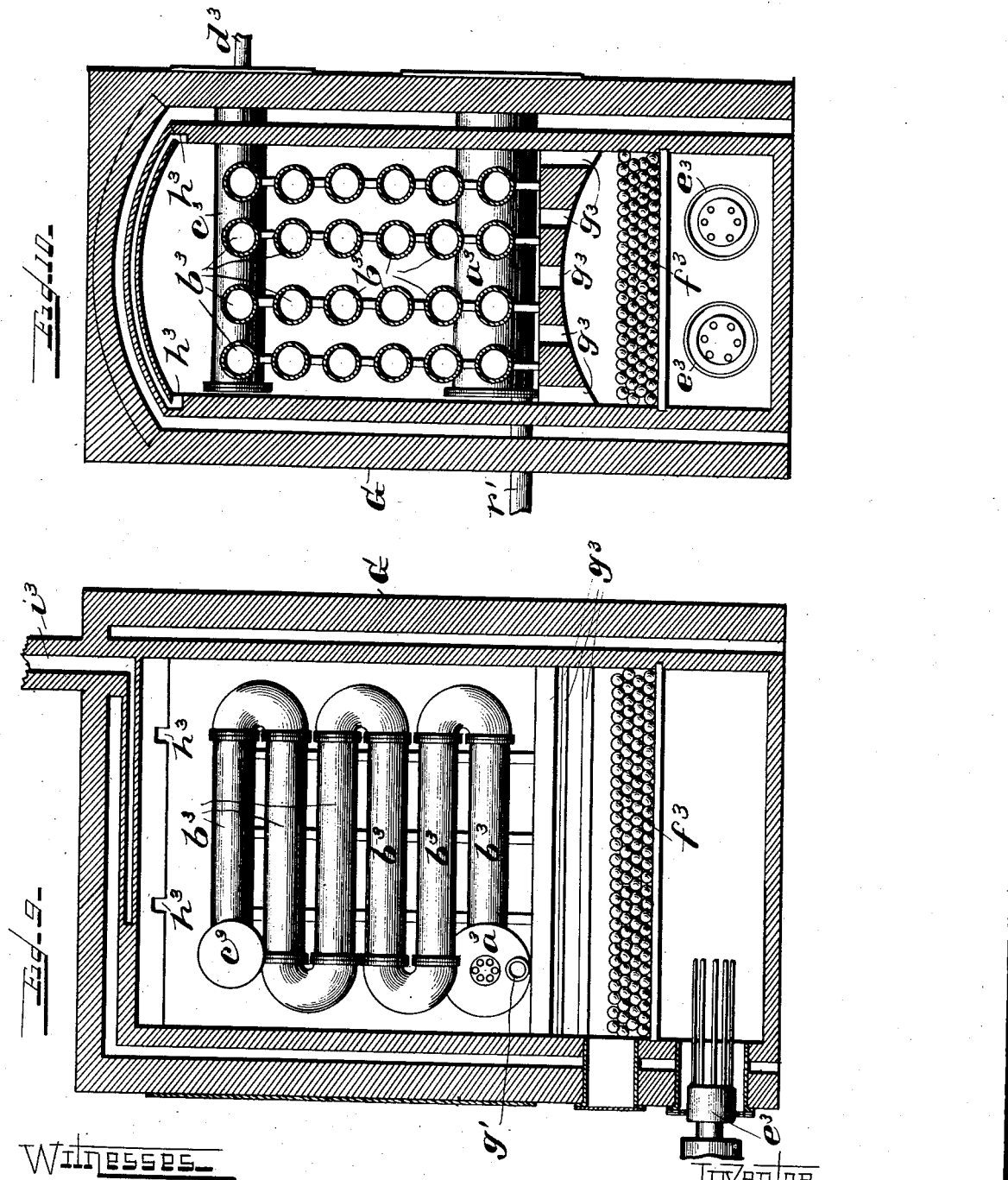

No. 826,214. PATENTED JULY 17, 1906.
J. J. JOHNSTON, DEC'D.
J. E. ALLEN, ADMINISTRATOR.
APPARATUS FOR MANUFACTURING GAS.
APPLICATION FILED SEPT. 17, 1897.
8 SHEETS—SHEET 7.
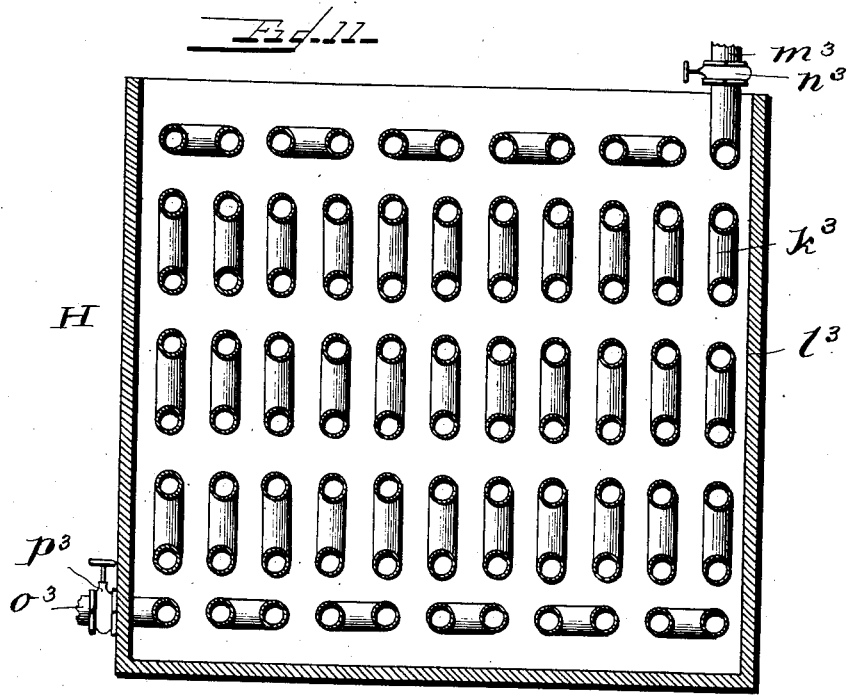
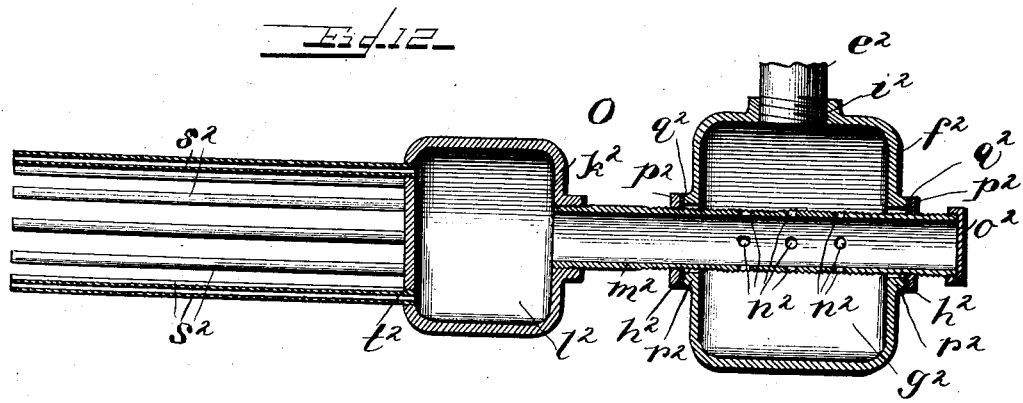

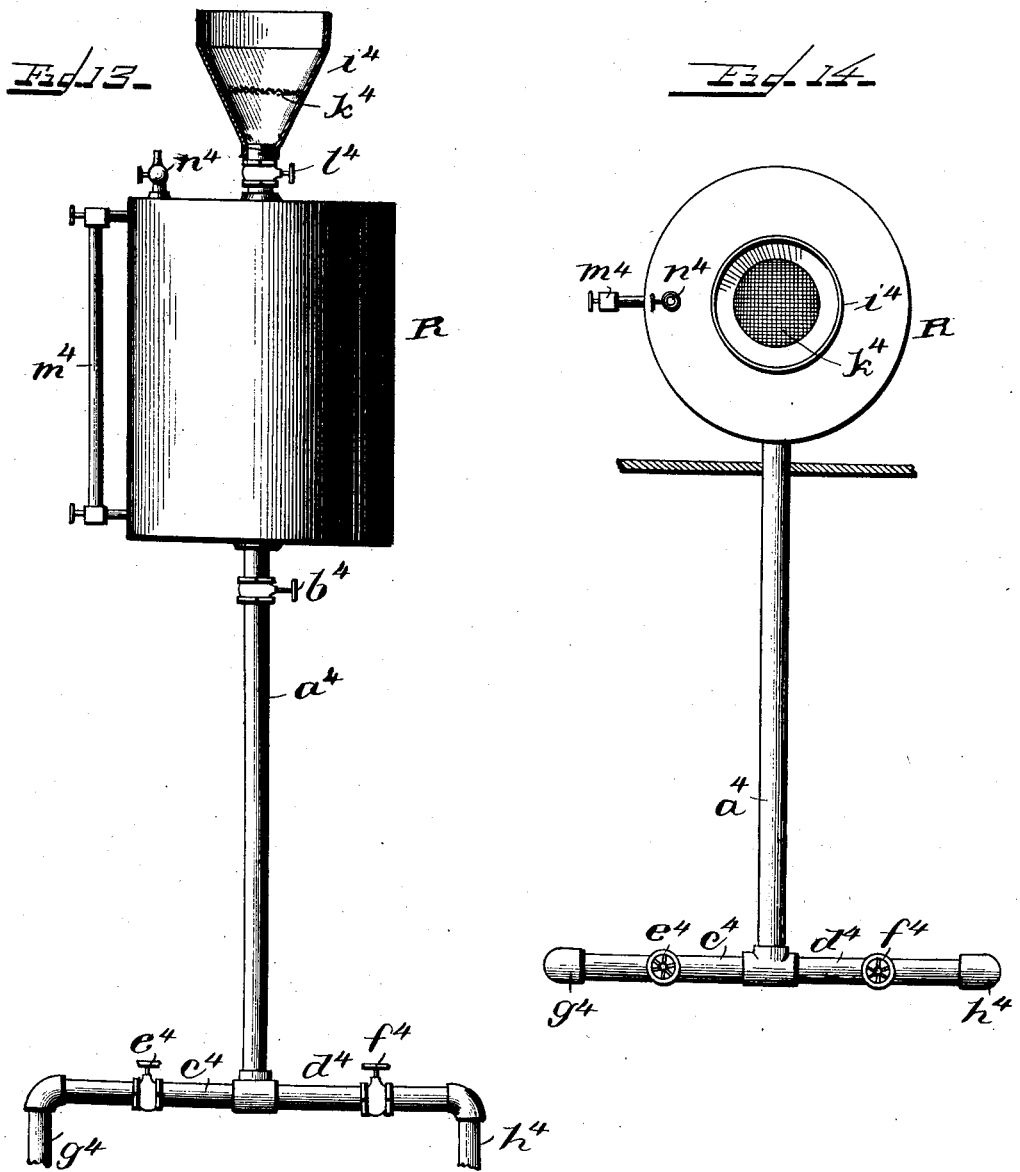

UNITED STATES PATENT OFFICE.

JOHN E. ALLEN, OF COLUMBIANA, OHIO, ADMINISTRATOR OF JAMES J. JOHNSTON, DECEASED, ASSIGNOR TO ALBERT C. ELLIS, OF PITTSBURG, PENNSYLVANIA.

APPARATUS FOR MANUFACTURING GAS.

No. 826,214.     Specification of Letters Patent.     Patented July 17, 1906.

Application filed September 17, 1897. Serial No. 652,051.

*To all whom it may concern:*

Be it known that JAMES J. JOHNSTON, deceased, formerly a citizen of the United States, residing at Columbiana, in the county of Columbiana and State of Ohio, did in his lifetime invent certain new and useful Improvements in Means for Manufacturing Gas; and I, JOHN E. ALLEN, residing at Columbiana, county of Columbiana, State of Ohio, administrator of the estate of the said JAMES J. JOHNSTON, do hereby declare the following to be a full, clear, and exact description of the invention, such as will enable others skilled in the art to which it appertains to make and use the same.

This invention relates to the manufacture of gas, and has for its object certain improvements in and means for manufacturing heating and illuminating gas, which will be fully disclosed in the following specification and claims.

With this object in view crude petroleum is used, and from it, by the apparatus hereinafter described, a heating-gas, an illuminating-gas, and a superior grade of refined oil is produced, which oil may be used to enrich a subsequent charge of crude oil in the manufacture of gas, or it may be stored and sold as an article of commerce for burning in lamps and for other purposes. By this apparatus all the oil charged into the generators may be evolved or converted into heating or illuminating gas, or a portion thereof, at certain stages in the operation, may be collected as a product of condensation or distillation in the form of refined oil.

In the accompanying drawings, which form part of this specification, Figure 1 represents a diagrammatic elevation; Fig. 2, a diagrammatic plan view; Fig. 3, a vertical section of the air-heater and a side elevation of the air-pump, partly in section; Fig. 4, a vertical section of a washer or condenser; Fig. 5, a vertical section and a side elevation, partly in section, of two connected generators; Fig. 6, a top plan of the upper tube-sheet in the generators; Fig. 7, an inverted plan of the lower tube-sheet; Fig. 8, a vertical section of the retorts and furnaces; Fig. 9, a vertical transverse section of the fixing apparatus and furnace; Fig. 10, a vertical longitudinal section of the same; Fig. 11, a vertical section of the cooler; Fig. 12, a longitudinal section of the gas-burner; Fig. 13, a side elevation of the residual-oil feeder, and Fig. 14 a top plan view of the same.

Reference being had to the drawings and the characters thereon, A indicates an air-pump which may be provided with a by-pass valve $a$ to return the air to the cylinder when working in excess of air required and is connected to the air-heater B by a pipe $b$. The construction of the heater B is shown in Fig. 3, in which $c\ d$ are plates connected by a series of tubes $e$, which communicate with chambers $f\ g$, the former being the receiving-chamber and the latter the discharge-chamber. The chamber $h$ around the tubes $e$ is supplied with steam for heating the air, as will hereinafter more fully appear.

The heater B is connected to the first of a series of generators C by a pipe $i$, which discharges into the chamber $j$. The generators are each provided with two partition-plates $k\ l$. To the plates $k\ l$ are permanently attached tubes $m$, the lower ends of which pass through openings in the plate $l$, thereby communicating with the chamber $n$, formed in the detachable end piece or head $o$ and by the plate $l$. The plate $l$ is provided with numerous perforations $p$, the combined area of which should be equal to the area of the pipe $i$. To plate $k$ is attached a pipe $q$, the opposite end of which is attached to the side wall of the head $r$. The generator C is also provided with a heating-coil $s$, which surrounds the pipes $m$. The upper and lower ends of said coil respectively communicate with a steam-supply pipe $t$ and a discharge-pipe $u$, said pipes being provided with suitable branches and valves. The lower head $o$ of each generator is connected to a pipe $v$ by a branch $w$, having a valve $y$ for supplying the charge of crude oil to the generators and for withdrawing heavy or residual oil.

The several generators are connected by the pipes $i$, as indicated in Figs. 1, 2, and 4. The last generator in the series is connected by pipe $x$ to a washer or condenser D, the construction of which is substantially the same as the generator C, with the heating-coil omitted, and is shown in Fig. 4.

The washer or condenser D, as shown in Fig. 4, is provided with two partition-plates 1 2, to which are attached tubes 3, the lower ends of which pass through the plate 2, thereby communicating with the chamber 4 in the head 5, and the plate 2 is provided with perforations 6. At the upper end of the washer is a head 7, having a chamber 8, and communicates with the last generator by a pipe $x$, and with the main N by a pipe 9, and is provided with a valve 10 and pipe 11 for discharging the water from the washer, which water is maintained at about the dotted line 12 or a little below the pipe $b'$.

Gas from the last generator C, after passing through chamber $x'$, enters the washer D through pipe $x$ and from chamber 8 passes down through tubes 3 into chamber 4, from which it rises through perforations 6 in plate 2 and passes up through the water and is discharged through pipe 9 into main N and passes on toward its final discharge. The light oil or distillate or resultant condensation of the oil in the gas or vapor collects on the surface of the water and is drawn off through pipe $b'$ at suitable intervals. The washer is filled with water about to the dotted line or a little below the pipe $b'$.

In the pipe $x$ is formed an enlarged chamber $x'$, in which the gas expands, and part of the by-product or light oil, the result of distillation and condensation, is arrested and collected and drawn off at suitable intervals through pipe $x^2$ and stored in a receiving-tank M for subsequent use.

The washer is provided with valves $a'$ $b'$, the former for supplying water thereto and the latter for drawing off refined oil.

To the washer D is connected the gas-main N, which is provided with a valve $c'$, and from the main a pipe $d'$, provided with a valve $e'$, connects with the horizontal extension of the primary retort E.

The primary retort E is provided with a vertical extension $f'$, through which it is charged with solids, and a horizontal extension $g'$, through which the solids are removed.

F indicates the secondary retort, which is provided with a vertical extension $h'$, through which it is charged with solids, and a horizontal extension $i'$, through which the solids are removed. The retorts are provided with ordinary sight-gages (not shown) to indicate the height of liquid in the retorts.

The primary retort is connected to the secondary retort by a pipe $k'$, leading from the extension $f'$, provided with a valve $l'$, and having a branch $m'$, provided with valve $n'$ and communicating with the extension $i'$ of the latter retort, and from the extension $h'$ of the secondary retort a pipe $o'$, having valve $p'$, connects with the pipe $k'$, and from pipe $k'$ a pipe $q'$, having valve $r'$, connects with the fixing-furnace G, and from the pipe $k'$ a pipe $s'$, having valve $t'$, connects with the main N, and a pipe $u'$ connects with a cooler or condenser H, and a pipe $v'$ with a washer I. The pipe $u'$ is provided with a valve $w'$ and the pipe $v'$ with a valve $y'$. By this construction of pipes and valves the gas from the washer D may all be directed into the main N, while the oil in generators C is yielding rich gas, or part of the gas may be conducted into only one or both of the retorts, and the gas may, after leaving the secondary retort, be conducted through the condenser H, or gas from the primary retort may be conducted into the fixing-furnace and from the fixing-furnace into the washer I.

The retorts E and F are suitably supported in masonry and provided with gas-burners O, having gas-supply pipes $e^2$ for heating the residual oil charged into one or both of them and are provided with safety-valves P and with thermometers and pressure-gages, which have been omitted from the drawings to avoid crowding and causing confusion.

The gas-burners consist of a hollow cylindrical body $f^2$, having a receiving-chamber $g^2$ therein and provided with openings $h^2$ at each end and an opening $i^2$ on its upper side, a hollow cylindrical body $k^2$, having a distributing-chamber $l^2$ therein, and the two chambers $g^2$ and $l^2$ are connected by a pipe $m^2$, which extends through the chamber $g^2$, is screw-threaded from a point inside of the inner end of the body $f^2$ to its outer end, and is provided with a series of perforations $n^2$ within the receiving-chamber and a cap $o^2$ at its outer end.

The openings $h^2$ are smooth-bored, and the pipe $m^2$ is secured in position by nuts $p^2$ $p^2$ with packing $q^2$ $q^2$ inserted between them and the ends of the bosses $r^2$ $r^2$. The opening $i^2$ is internally screw-threaded to receive the gas-supply pipe $e^2$.

The perforations $n^2$ in the pipe $m^2$ serve a twofold purpose—namely, they admit the gas from the receiving-chamber $g^2$ to supply the burner and also serve as a safeguard against the gas burning back into the source of supply. The perforations equal in number the discharge-tubes $s^2$ and are of the internal diameter of the tubes—namely, one-fourth of an inch. The discharge-tubes $s^2$ are about twelve inches long and are arranged in a circle in the head $t^2$ of the body $k^2$. The gas flowing from the receiving-chamber $g^2$ through pipe $m^2$ into the distributing-chamber $l^2$ expands in the latter chamber, and thereby absorbs the pulsations of the air-pump or from any other cause and produces a steady and uninterrupted flow of gas to the tubes $s^2$.

The burners O are surrounded by an annular air-supplying chamber $u^2$, formed in the wall of the masonry, and may be provided with a valve $v^2$, having a series of openings $w^2$ to regulate the quantity of air admitted.

The combustion-chamber Q of the furnace is provided with perforated tile $y^2$, of refractory material, arranged at an angle to the plane of the burners and against which the gas from the burners and the air impinge as they enter the furnace, and underneath the tile is a chamber $z^2$ filled with pieces of firebrick or other refractory material. The tile and the pieces of refractory material become highly heated, and the gas and air, striking the inclined surface, enter the perforations, are thoroughly commingled, and burn with great intensity.

The burner forms subject-matter of another application for a patent filed herewith and numbered 652,052, patented June 30, 1903, No. 732,685.

The fixing apparatus consists of a cylinder $a^3$, to which is attached a series of pipes $b^3$, which extend across the furnace and at their upper ends communicate with a cylinder $c^3$, which cylinder and horizontal portions of the pipes should be filled with small pipes for the purpose of augmenting the heating-surface with which the gas comes in contact. The cylinder $a^3$ connects with the pipe $q'$, and the cylinder $c^3$ connects by branch $d^3$ with the pipe $k'$, communicating with the washer I, which may be constructed the same as the washer D. From the washer I the gas is conducted through pipe $d^5$ to a main N and then to a holder J.

The fixing apparatus is supported in the furnace G and is heated by gas-burners $e^3$, the flame from which is spread by contact with the balls $f^3$, which may be of fire-clay or other refractory material, resting upon the grate-bars of the furnace. The crown of the combustion-chamber of the furnace is provided with vertical passages $g^3$ for the flame and heat to enter the chamber in which the fixing apparatus is placed, and from it the waste products of combustion pass off through flues $h^3$ into stack $i^3$.

The cooler H consists of a pipe $k^3$, which is contained in a tank $l^3$, supplied with running water to keep the pipe cool by any preferred arrangement of supply and discharge pipes. (Not shown.) The cooler is connected at its upper end to pipe $k'$ by a branch $m^3$, provided with valve $n^3$, and at its lower end it communicates with pipe $d^5$ by pipe $o^3$, provided with valve $p^3$. The pipe $k'$ is provided with a valve $q^3$ to cut off communication with the washer I, and the pipe $d^5$ with a valve $r^3$ to cut off communication between the washer and the main N.

K indicates a supply-tank from which oil is conducted through pipe $s^3$ to pipe $v$, which extends along under the entire series of generators C for charging them through the branches $w$ and valves $y$, and the heavy or residual oil is conducted through said valves, branches, and pipes $v$ and $t^3$ to the tank L. In practice the heavy or residual oil is forced from the several generators C to the tank L by pressure of air from the pump A, and a connection may also be made from the pump to the tanks K and L for discharging their contents, as indicated in dotted lines at 3 4 in Fig. 1 and 2.

R indicates the residual-oil feeder, connected to the retorts E and F by a vertical pipe $a^4$, having valve $b^4$ and horizontal pipe $a^5$ and laterally-extending pipes $c^4$ $d^4$, having valves $e^4$ $f^4$, and discharge into the retorts, respectively, through vertical pipes $g^4$ and $h^4$. The feeder is preferably provided with a funnel $i^4$, having strainer $k^4$ to arrest any foreign matter, and with a valve $l^4$, which controls the supply to the feeder from a pump with suitable connections. The feeder is also provided with a sight-gage $m^4$ to indicate the height of the oil in the feeder and with an air-valve $n^4$ to relieve the feeder of air to charge it with residual oil.

In making heating-gas residual oil is supplied to the primary retort E only in quantity to be vaporized and the vapor mingled with the gaseous product coming from the generators; but in making illuminating-gas residual oil may be supplied to both the primary retort E and the secondary retort F in the proportion of about twice the quantity to the former that is supplied to the latter.

Both the retorts are supplied with a non-oleaginous carbonaceous substance, such as hard-wood charcoal $o^4$, which has been carefully selected to be free from bark, dust, or any solid matter of greater specific gravity than the oil that may rest on the bottom of the retort to exclude oil from contact with the metal, and thereby cause it to burn, or coke may be used. Preference is, however, given to charcoal.

The residual-oil tank L is connected to the pipe $v$ by a pipe $t^3$, having valve $u^3$, and the refined-oil tank M is connected to the same pipe $v$ by a pipe $v^3$, having valve $w^3$, and the pipe $v$ is connected to a pump (not shown) by a pipe $y^3$, so that all the oil used may be supplied and transferred by the same pump.

The several generators and washers should be provided with the ordinary sight-gage to indicate the height of liquid, as shown at $g^2$ in Fig. 5.

Water is supplied to the several washers or condensers by means of pipe $a^5$, branches $b^5$, and valves $c^5$, and the pipe $a^5$ connects with the pipe $v$ for washing the generators when desired.

In the practical demonstration of this invention a large number of plants have been constructed for the purpose of ascertaining the best form of generators, and therefrom it has been concluded that the best results can be obtained by adopting the following proportions, to wit: For generators three feet in diameter the height should be about fifteen feet, the pipes $i$ connecting the generators about four inches in diameter, the tubes $m$ about two inches in diameter, and a sufficient number employed to furnish an area a little greater than the cross-sectional area of the pipe $i$. For generators four feet in diameter the height should be twelve feet, pipes $i$ five inches, and tubes $m$ two inches. For generators five feet in diameter the height should be ten feet, the pipes $i$ eight inches, and tubes $m$ two inches. In all of the generators the number of tubes $m$ must be governed by the area of the pipes $i$ and distributed throughout the generators.

The invention is not limited to the proportions enumerated, but from experience they are the most desirable, and these proportions are given to enable the constructor to make a plant with certainty of successful operation. The generators may be reduced in size as well as increased by the skilled mechanic without departing from the spirit of the invention. All of the valves should be gate-valves or key-valves to form direct or unobstructed passages for the fluid.

The retort E should be about equal in diameter to the generators and about two-thirds the length thereof, the retort F about two-thirds the length of retort E, and the washers should be about the size of the generators used.

The method involved in this invention is claimed in a divisional application for a patent, Serial No. 131,319, filed November 14, 1902.

The generators C are charged from tank K with crude petroleum, preferably in the condition in which it is taken from the earth, (the specific gravity of which varies in different localities,) to a depth of about three feet, and the washers are supplied with water to about four feet in depth. Cold water is charged into the washers and is maintained at a temperature below the temperature of the gas coming from the generators. The retort E must be heated (and in practice it has been found that from 400° to 600° Fahrenheit is sufficient) to vaporize the oil, the retort F heated to from 400° to 700° (when charcoal is used in the latter retort) to make fuel-gas to be burned direct without the use of a holder, and the fixing apparatus in the furnace G to from 1,000° to 1,200° Fahrenheit to fix the gas for illuminating purposes. Care must be taken to prevent the retorts being heated to a degree to ignite the charcoal. Therefore when retort F alone is used to dry or fix the vapors or gas emanating from retort E clean coke should be used in retort F and may be heated to from 1000° to 1500° Fahrenheit with safety. Steam is now supplied through pipe $t$ to the chamber $h$ of the air-heater B, the pump A put into operation and air forced into the heater under an initial pressure of from four to fifteen pounds to the square inch, the pressure varying according to the proportionate size of the plant and heated to about 90° Fahrenheit during the first stage of the operation. From the heater the air is conducted into the chamber $j$ of the first generator C and passes down through the tubes $m$ into the chamber $n$, where it comes in contact with the oil, agitates it, and passes up through the perforations $p$ in the plate $l$ and through the body of the oil above said plate and mingles with the permanent gas, always present in the oil in its crude state, and then from the space above the oil it enters the branch $q$ and flows through pipe $i$ into the next generator C and throughout the entire series of generators into and through the washer D, then into the retort E, where it mingles with and is enriched by the gas evolved from the oil vaporized in the presence of the charcoal, passes up through and is further enriched by the vapors held in suspension by the charcoal and the carbon of the charcoal. In this operation the charcoal cracks the fine globules of vaporized oil, takes up and gives off the vapors continually, as the gaseous product passes through it, the charcoal in the upper portion of the retort being much hotter than the oil. In manufacturing fuel-gas the gas is preferably conducted from the retort F to the cooler H, the gas having been sufficiently dried or heated in said retort to make a fixed gas and is in condition to be distributed through mains or supply-pipes to the place or places of consumption or to a holder; but in the manufacture of illuminating-gas it may be found desirable to conduct the gas from the primary retort E through the secondary retort F and then to the fixing apparatus, and from the fixing apparatus the gas should be conducted through the washer I to relieve it of any impurities, such as carbon, formed in the fixer before conducting the gas to the holder.

In starting the operation of the plant, the retort and the fixing apparatus may be heated by gas evolved in the generators and passed through the washer D by making a connection between the pipe $c'$ and the burners in their respective furnaces, or the gas may be used for general heating purposes from said point, or the gas after having been enriched in the retorts E and F and passed through the cooler H may be conducted from pipe N for use as a heating-gas to be consumed as fast as it is generated when short supply-mains are required to reach the place of consumption.

The plant is worked with the air or the oil heated to about 90° until the permanent gas in the oil and the emanations of the oil capable of being liberated at so low a degree of temperature have been carried off, and the gas shows signs of becoming "lean," "short," or weak. This is what is designated the first stage in the operation. Steam is then admitted to the coils $s$ in the generators C, and the oil heated to further liberate the gas and the emanations of the oil and evolve the oil into gas, the heat being increased as the operation progresses for the purpose of keeping the quality of the gas at a fixed standard, which may be ascertained by a test light burning under a given fixed pressure. The gradual increase of the temperature of the oil required will be readily ascertained by the skilful operator.

The oil in the generators may be kept at the depth indicated by providing them with automatic feeding devices or by forcing oil in from the supply-tank.

In the operation of the plant or apparatus a large quantity of refined oil of a superior quality, the result of distillation or condensation, collects upon the surface of the water in the washer D, which may be drawn off through pipe $b'$ of said washer and conveyed through pipes (not shown) to a suitable receptacle, such as M. This oil is of a specific gravity of about 60°, which is much lighter than the oil of the original charge and is transparent and may be used for enriching a subsequent charge in the generators, or it may be utilized as a burning-oil for lamps. The oil requires no treatment with sulfuric acid and caustic soda to bleach it and will therefore feed up the wick of a lamp better than oil thus treated.

The heavy or residual oil in the generators, which has been worked down to a low specific gravity, is conducted from the generators to the tank L, from which it is conducted into the feeder R of the retorts E and F to be used in subsequent charges for enriching the gas from the generators, or the residual oil may be conducted directly from the generators to the feeder R. By thus working the heavy or residual oil in the presence of charcoal or coke in the retorts, all of the oil may be converted into gas and the formation of coal-tar of hard or baked carbon from the oil prevented forming in the retorts.

It will be observed that seven generators are shown, the purpose of which is that the heavy oil may be drawn from one generator at a time, thereby keeping a full complement of, preferably six, generators in use for making gas.

In making illuminating-gas by the apparatus herein described the oil in the generators should be heated from about 150° Fahrenheit to 250° Fahrenheit as the specific gravity of the oil decreases and the entire method worked moderately until the gaseous product from the generators reaches the fixing apparatus, and the heat of the fixing apparatus should be maintained at a temperature not exceeding 1,200° nor less than 1,000°, which can be easily done by using the gas as a heating medium. The candle-power of the gas may be ascertained by a test-light or by a photometer, such as the well-known Jones instrument.

When it is desired to stop the pump for any cause, care should be taken to close the valve in the pipe between the pump and the air-heater. This becomes necessary to prevent back pressure driving the liquid in one generator back into another. The air-pump should be of a capacity to supply air to the generators at a moderate speed of the pump to prevent carrying oil from one generator to the other, thus allowing the excessive particles of oil taken up by the air to precipitate in each generator and affording time for the air and the gaseous emanations from or products of the oil to combine with the air and form a fixed gas.

In making fuel-gas the same operation is practiced with reference to the heat applied to the oil in the generators and the working of the air-pump.

In the practical operation of the invention by heating the residual oil in the retorts in the presence of charcoal or coke and converting said oil into gas the fact has been demonstrated repeatedly that no coal-tar is formed in the retorts, and as a consequence no solidified carbon adheres to the inside of the retorts, which when formed invariably causes the metal of which the retorts are formed to be burned by preventing the oil coming in contact with the metal where it is exposed to a high degree of heat, and it has further been demonstrated that all the oil can be converted into gas, if desired.

When the pores of the charcoal or coke become filled, so that it can no longer take up and give off the oil in the gas, it should be removed from the retorts and fresh charcoal or coke supplied. This condition of the charcoal will be manifested by the presence or accumulation of thick oil, which will be shown in the sight-gage applied to the horizontal necks of the retorts, but not shown in the drawings. The gaseous product from the generators may all be conducted through the retorts, or part may be permitted to flow through the main N and mingle with the gas from the retorts, and all or part of the gas from retort E may be conducted through retort F by manipulation of the valves connecting the main with the retorts and the retorts with each other and will be readily learned by the operator, as the quality of the gas will require.

When working with fresh oil in all the generators, the gas is of sufficient richness to omit the retorts and is conducted from the washer D (or the washer may be omitted) through main N without passing through the retort or retorts until the gas shows signs of becoming weak or lean, when by manipulating the valve $c'$ in the main N and valve $e'$ in pipe $d'$ all or part of the gas from the generators may be conducted through the retort or retorts.

The water in the washer D may be with-drawn, and the vessel may be used to arrest the light oil of distillation and condensation from the generators, and thus prevent it being carried into the main N and into the retort E when used or to the burners or holder when the retort or retorts are not being used.

Having thus fully described the invention, what I claim is—

1. The combination of an air-pump, a plurality of generators, means for collecting light oil, a retort, means for supplying residual oil thereto, a main gas-pipe and connections therewith and with the retort between the generators and the retort and beyond the retort.

2. A generator consisting of upper and lower removable heads, perforated diaphragms adjacent to the heads and tubes connecting said diaphragms, chambers in the heads at each end of the generator and a heating-coil within the generator, in combination with supply and discharge pipes, substantially as described.

3. A generator consisting of an upper head and a perforated diaphragm adjacent thereto, a lower head and a perforated diaphragm adjacent thereto, in combination with a supply-pipe communicating with the chamber in the head at the upper end of the generator, a pipe within said chamber, and a pipe for connecting with an adjacent generator, substantially as described.

4. Apparatus for generating gas, consisting of an air-pump, a series of generators and a retort, in combination with a washer, means for collecting light or refined oil, a supply-tank, a residual-oil holder and intermediate connections substantially as described.

5. Apparatus for generating gas, consisting of an air-pump, an air-heater, a series of connected generators, means for collecting refined or light oil, a retort, means for directing part or all the gas from the generators into the retort, a residual-oil feeder for the retort and suitable connections substantially as described.

In testimony whereof I affix my signature in presence of two witnesses.

JOHN E. ALLEN,
Administrator of the estate of James J. Johnston, deceased.

Witnesses:
HIRAM G. BYE,
HENRY STALEY.